United States Patent
Hatakeyama et al.

(10) Patent No.: US 6,509,097 B1
(45) Date of Patent: Jan. 21, 2003

(54) ACRYLIC FILMS AND ACRYLIC LAMINATES

(75) Inventors: Hiroki Hatakeyama, Otake (JP); Kazuaki Hayashida, Otake (JP); Yukio Kitaike, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/508,093

(22) PCT Filed: Sep. 14, 1998

(86) PCT No.: PCT/JP98/04137

§ 371 (c)(1),
(2), (4) Date: Mar. 16, 2000

(87) PCT Pub. No.: WO99/14272

PCT Pub. Date: Mar. 25, 1999

(30) Foreign Application Priority Data

Sep. 16, 1997 (JP) .......................................... 09-250681

(51) Int. Cl.⁷ ........................ C08L 51/00; C08L 33/10
(52) U.S. Cl. ..................... 428/412; 428/483; 428/500; 428/515; 428/517; 428/523; 525/85
(58) Field of Search ................ 525/78, 85; 428/412, 428/483, 500, 515, 517, 523

(56) References Cited

U.S. PATENT DOCUMENTS 4,508,875 A * 4/1985 Kishida et al. ............. 525/308
5,804,287 A * 9/1998 Hatakeyama et al. ....... 428/220

FOREIGN PATENT DOCUMENTS

| DE | 30 24 258 | | 1/1982 |
| JP | 59-124916 | | 7/1984 |
| JP | 6-73199 | | 3/1994 |
| JP | 06-73199 | * | 6/1994 |
| JP | 7-238202 | | 9/1995 |
| JP | 8-323934 | | 12/1996 |
| JP | 9-272778 | | 10/1997 |

OTHER PUBLICATIONS

CAPLUS AN 1994:459343, 1994.*

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

An acrylic film with excellent flexibility is easy to process and has 70 to 95 parts by weight of an acrylic rubber-containing polymer (A) and to 30 parts by weight of an acrylic-based thermoplastic polymer (B) and having a total amount of (A) and (B) of 100 parts by weight; a gel content of 50 to 70% by weight; and elongation at break in one direction of 180% or more. The acrylic rubber-containing polymer (A) has an elastic copolymer having a monomer unit whose polymer has a glass transition temperature of more than 65° C. The acrylic-based thermoplastic polymer (B) has a glass transition temperature of 65° C. or less and a weight average molecular weight of 100,000 to 300,000.

17 Claims, No Drawings

ACRYLIC FILMS AND ACRYLIC LAMINATES

TECHNICAL FIELD

The present invention relates to an acrylic film having a good processability and to an acrylic laminate obtained by laminating and bonding the film.

BACKGROUND ART

Acrylic resins, particularly methyl methacrylate-based resins, are known as resins excellent in both a transparency and a weather resistance and are in wide use for cast moldings, extrusion moldings and the like. However, these methyl methacrylate-based resins are generally brittle and have not been suited for use as film or sheet materials. Accordingly, a number of attempts have been made to obtain a composition for film which is improved in a flexibility and can be used as film or sheet materials. Such attempts include, for example, the use of a multilayer structure polymer as described in U.S. Pat. No. 4,508,875, A and a development of a blend with an acrylic rubber as described in JP-B-6-45737. The above-mentioned compositions for film had problems in that though a Tg of a polymer which forms a matrix (hereinafter referred to as matrix Tg) is relatively high and the resulting film shows elongation at break of about 100% and thereby the film can be satisfactorily used for conventional protective films, the film cannot bend and gets broken when the film is subjected to a bending work with a small radius of curvature or a bending work at a high speed. Thus, the compositions have been restricted in their use. Further, when the matrix Tg is simply lowered, a resistance to solvents and a resistance to hot-water whitening become poor and moreover a film-forming property becomes poor to make a satisfactory film preparation difficult, as described in JP-B-62-19309.

DISCLOSURE OF THE INVENTION

The present inventors have made extensive study to solve the above-mentioned problems. In result, it has been found that by selecting the matrix Tg at 65° C. or less, increasing a weight average molecular weight thereof to 100,000–300,000 more than that of a previous one and increasing a gel content of a film composition to 50–70% by weight, elongation at break can be increased to as high as 180% or more without a deterioration of a solvent resistance and a film-forming property, further that a resistance to hot-water whitening can be improved by adding 0.5–5 parts by weight of a polyalkylene glycol, and that when elongation at break of the film is 180% or more, the film can bend with a small radius of curvature and at a high speed and resultantly the film has a tendency not to break at the work.

Thus, the points of the present invention are an acrylic film comprising 70 to 95 parts by weight of (A) an acrylic rubber-containing polymer and 5 to 30 parts by weight of (B) an acrylic-based thermoplastic polymer and having a total amount of (A) the acrylic rubber-containing polymer and (B) the acrylic-based thermoplastic polymer of 100 parts by weight, a gel content of 50 to 70% by weight, and elongation at break in one direction of 180% or more, wherein (A) the acrylic rubber-containing polymer comprises an elastic copolymer comprising 50 to 99.9% by weight of an alkyl ester of an acrylic acid monomer unit, 0 to 49.9% by weight of other copolymerizable vinyl monomer unit, and 0.1 to 10% by weight of a copolymerizable crosslinkable monomer unit, and a monomer or a mixture thereof comprising 40 to 100% by weight of an ester of a methacrylic acid and 0 to 60% by weight of a vinyl monomer copolymerizable therewith, wherein a glass transition temperature of a polymer of the monomer or the mixture exceeds 65° C.; (A) the acrylic rubber-containing polymer has a gel content of at least 60% by weight, a graft rubber particle diameter of 0.08 to 0.16 μm, and a calcium content of 50 to 500 ppm; and at least 10% of 10 to 400 parts by weight of the monomer or the mixture is bonded to and is graft-polymerized onto 100 parts by weight of the elastic copolymer, and wherein (B) the acrylic-based thermoplastic polymer comprises 50 to 100% by weight of an ester of a methacrylic acid monomer unit having an alkyl group of 1 to 4 carbon atoms, 0 to 50% by weight of an ester of an acrylic acid monomer unit, and 0 to 50% by weight of at least one other copolymerizable vinyl monomer unit; and (B) the acrylic-based thermoplastic polymer has a glass transition temperature of 65° C. or less and a weight average molecular weight of 100,000 to 300,000, and an article obtained by laminating the acrylic film.

BEST MODE FOR CARRYING OUT THE INVENTION

The acrylic rubber-containing polymer (A) used in the present invention is a graft copolymer having a multilayer structure of two or more layers which contains an acrylic acid alkyl ester monomer unit as a main component of the rubber and has a function of imparting an excellent impact resistance and elongation to a resin composition.

The acrylic rubber-containing polymer (A) used in the present invention may be obtained by copolymerizing a monomer mixture comprising 50–99.9% by weight of an acrylic acid alkyl ester monomer unit, 0–49.9% by weight of a copolymerizable other vinyl monomer unit and 0.1–10% by weight of a copolymerizable crosslinkable monomer unit in one or more stages to obtain an elastic copolymer, and then, in the presence of 100 parts by weight of the elastic copolymer obtained above, polymerizing 10–400 parts by weight of a monomer or a mixture thereof comprising 40–100% by weight of a methacrylic acid ester and 0–60% by weight of a vinyl monomer copolymeriable therewith, a polymer of the monomer or the mixture thereof having a glass transition temperature more than 65° C., in one or more stages. When a content of the acrylic acid alkyl ester monomer unit in the elastic copolymer is less than 50% by weight, a sufficient flexibility cannot be imparted to the film. The presence of a layer whose acrylic acid alkyl ester monomer unit content is less than 50% by weight as a core inside the elastic copolymer is allowable so long as the acrylic acid alkyl ester monomer unit content in the elastic copolymer as a whole, including the core layer, is 50% by weight or more. When a content of the crosslinkable monomer unit is less than 0.1% by weight, a sufficient crosslinking effect cannot be obtained; when the content exceeds 10% by weight, the resulting elastic property is deteriorated.

The acrylic acid ester which may be used herein is an acrylic acid alkyl ester having an alkyl group of 1–8 carbon atoms, for example, methyl acrylate, ethyl acrylate, propyl acrylate, butyl acrylate, 2-ethylhexyl acrylate and n-octyl acrylate etc., used each alone or as a mixture thereof. One having a low Tg is preferable, butyl acrylate being most preferred. The copolymerizable vinyl monomer may be conventional ones, which include, for example, acrylic or methacrylic acid higher alkyl esters, acrylic or methacrylic acid lower alkoxy esters, acrylic or methacrylic acid cyanoethyl ester, acryl- or methacrylamide, acrylic or methacrylic acid, styrene, alkyl-substituted styrenes, acrylonitrile, methacrylonitrile, maleic acid, fumaric acid and vinyltoluene etc., but they are not limited thereto. The methacrylic acid esters used are preferably methacrylic acid alkyl esters having an alkyl group of 1–4 carbon atoms, e.g., methyl methacrylate, ethyl methacrylate, propyl methacrylate and butyl methacrylate etc., used each alone or as a mixture thereof.

The crosslinkable monomers are not particularly restricted but are preferably ethylene glycol dimethacrylate, butanediol dimethacrylate, allyl acrylate, allyl methacrylate, diallyl phthalate, triallyl cyanurate, triallyl isocyanurate, divinylbenzene, diallyl maleate, trimethylol triacrylate and allyl cinnamate; they may be used each alone or in a combination of two or more thereof.

Of the acrylic rubber-containing polymer (A), a multilayer structure polymer (AA) described below is particularly preferable because it gives a better resistance to bending whitening.

Monomer compositions used in the multilayer structure polymer (AA) used in the present invention are as follows. The acrylic acid alkyl esters having an alkyl group of 1–8 carbon atoms and the methacrylic acid alkyl esters having an alkyl group of 1–4 carbon atoms which are used to constitute the innermost layer polymer (AA-a) in the multilayer structure polymer (AA) are those described above, used each alone or as a mixture thereof. A content of a unit of these acrylic or methacrylic acid alkyl ester monomers (AA-a1) is 80–100% by weight. These acrylic or methacrylic acid alkyl esters as the monomer are, in the later multi-stage reaction, most preferably used consistently but a mixture of two kinds or more of the monomers or another kind of acrylic or methacrylic acid alkyl ester may also be used depending upon a final purpose.

Monomers (AA-a2) having a copolymeriable double bond preferably used are preferably such acrylic monomers as acrylic acid higher alkyl esters, acrylic acid lower alkoxy esters, acrylic acid cyanoethyl ester, acrylamide, acrylic acid and methacrylic acid; they are used in the range of 0–20% by weight. Further, the (AA-a) component may contain, in the range not exceeding 20% by weight, a unit of such monomers as styrene, alkyl-substituted styrenes, acrylonitrile, methacrylonitrile, etc.

Examples of multifunctional monomers (AA-a3) preferably used include dimethacylic acid alkylene glycol esters, such as ethylene glycol dimethacrylate, 1,3-butylene glycol dimethacrylate, 1,4-butylene glycol dimethacrylate and propylene glycol dimethacrylate. Polyvinylbenzenes, such as divinylbenzene and trivinylbenzene, and diacrylic acid alkylene glycol esters may also be used. These monomers act effectively in crosslinking a layer itself in which they are contained, but do not act in interlayer bonding with other layers. Even when no multifunctional monomers (AA-a3) are used at all, a fairly stable multilayer structure can be obtained so long as a graft-linking agent is present but, in the case where a good hot strength etc. is strictly demanded, they may optionally be used according to an intended object in the range of 0–10% by weight.

Examples of the graft-linking agent used include allyl, methallyl or crotyl ester of copolymeriable $\alpha,\beta$-unsaturated carboxylic acids or dicarboxylic acids, preferably allyl esters of acrylic acid, methacrylic acid, maleic acid or fumaric acid. In particular, allyl methacrylate has an excellent effect. Further, triallyl cyanurate and triallyl isocyanurate etc. are also effective as the graft-linking agent. Such graft-linking agents react, mainly in a conjugated unsaturated bond of the ester, far more rapidly than in the allyl group, methallyl group or crotyl group, and participate in a chemical bonding. During the reaction, the substantial part of the allyl groups, methallyl groups or crotyl groups act effectively during a polymerization of a polymer of a next layer and thus give a graft bonding between adjacent two layers.

An amount of the graft-linking agent used is very important. It is used in the range of 0.1–5 parts by weight, preferably 0.5–2 parts by weight, relative to 100 parts by weight of the total amount of the above-mentioned components (AA-a1) to (AA-a3). When the amount used is 0.1 part by weight or less, an effective amount of the graft bonding is too small. When the amount used exceeds 5 parts by weight, an extent of a reaction with a crosslinked elastic polymer (AA-b) formed at the second stage polymerization becomes large, resulting in lowering of an elasticity of a two-layer crosslinked rubber elastomer comprising a two-layer elastomer structure.

A content of the innermost layer polymer (AA-a) in the multilayer structure polymer (AA) in the present invention is 5–35% by weight, preferably 5–15% by weight, and is preferably smaller than a content of the crosslinked elastic polymer (AA-b).

The crosslinked elastomer (AA-b) constituting the multilayer structure polymer (AA) is a main component which imparts a rubber elasticity to said multilayer structure polymer. (AA-b1) to (AA-b3) components and graft-linking agents etc. used for constituting the elastomer are respectively those used for the innermost layer polymers (AA-a1) to (AA-a3) described above. Amounts of the components used are 80–100% by weight of the (AA-b1) component, 0–20% by weight of the (AA-b2) component and 0–10% by weight of the (AA-b3) component, and the graft-linking agent is used in the range of 0.1–5 parts by weight relative to 100 parts by weight of the total amount of (AA-b1) to (AA-b3).

A content of the crosslinked elastic polymer (AA-b) in the multilayer structure polymer (AA) in the present invention is preferably in the range of 10–45% by weight, and is preferably higher than a content of the above-mentioned innermost layer polymer (AA-a).

Outermost layer polymer (AA-c) constituting the multilayer structure polymer (AA) in the present invention participates in imparting desirable forming property and mechanical properties to the multilayer structure polymer. (AA-c1) and (AA-c2) components used for constituting the polymer are those which are equivalent to the component (AA-a1) and the component (AA-a2) described above. An amount of the components used are in the range of 51–100% by weight for the (AA-c1) component and 0–49% by weight for the (AA-c2) component. The outermost layer polymer (AA-c) in the multilayer structure elastic polymer (AA) has a glass transistion temperature exceeding 65° C. When the temperature is not higher than 65° C., a blocking is apt to occur at the time of a coagulation and drying after a polymerization, so that conventional, industrial and economical drying methods cannot be adopted. The glass transition temperature of the outermost layer polymer can be judged from a composition of a polymer component which is not forming a gel and is soluble in solvents.

A content of the outermost layer polymer (AA-c) in the multilayer structure elastic polymer (AA) in the present invention is 10–80% by weight, preferably 40–60% by weight.

The multilayer structure polymer (AA) in the present invention comprises the above-mentioned innermost layer polymer (AA-a), crosslinked elastic polymer (AA-b) and outermost layer polymer (AA-c) as a basic structure and further, between the polymer (AA-b) layer and the polymer (AA-c) layer, at least one intermediate layer (AA-d) composed of a polymer formed from 100 parts by weight of a monomer mixture comprising 10–90% by weight of an acrylic acid alkyl ester having an alkyl group of 1–8 carbon atoms (AA-d1), 90–10% by weight of a methacrylic acid alkyl ester having an alkyl group of 1–4 carbon atoms (AA-d2), 0–20% by weight of a monomer having a copolymerizable double bond (AA-d3) and 0–10% by weight of a multi-functional monomer (AA-d4), and 0.1–5 parts by weight of a graft-linking agent, the intermediate layer being provided such that the amount of the acrylic acid alkyl ester in the intermediate layer (AA-d) may decrease monotonously from the crosslinked elastic polymer (AA-b) toward the outermost layer (AA-c). The (AA-d1) to (AA-d4) components and the graft-linking agent used herein are those which are equivalent to the respective components used in the innermost layer polymer (AA-a). The use of the graft-linking agent in the intermediate layer (AA-d) is essential for bonding the respective layers closely and thereby obtaining excellent several properties.

A content of the intermediate layer (AA-d) in the multilayer structure polymer (AA) in the present invention is 5–35% by weight. When the content is less than 5% by weight, the layer looses a function needed as the intermediate layer. A content higher than 35% by weight is unfavorable because the resulting final polymer is poor in property balance. The presence of 5% by weight or more of the intermediate layer (AA-d) makes it possible to prevent a whitening at the time of bending work.

A gel content of the acrylic rubber-containing polymer (A) in the present invention has to be 60% by weight or more and is preferably 70% by weight or more. The gel content herein includes one or more layers of the crosslinked rubber elastomer itself and a component grafted to the crosslinked rubber elastomer. The term "gel content" refers to a value of % by weight of insolubles obtained by preparing a 1% by weight methyl ethyl ketone solution of the acrylic rubber-containing polymer, allowing the solution to stand at 25° C. for day and night and then subjecting the solution to a centrifugation at 16,000 rpm for 90 minutes. When the gel content of the acrylic rubber-containing polymer (A) is less than 60% by weight, elongation at break of the resulting film tends to be smaller than 180%. Since a gel content of the resulting film composition needs to be 50% by weight to 70% by weight, the gel content has to be adjusted according to a blending ratio of the acrylic rubber-containing polymer (A) to the acrylic-based thermoplastic polymer (B).

A graft rubber particle diameter of the acrylic rubber-containing polymer (A) has to be 0.08–0.16 $\mu$m. The graft rubber particle diameter can be determined by observing with an electron microscope. When the graft rubber particle diameter is less than 0.08 $\mu$m, the film tends to be brittle and elongation at break tends to be less than 180%. When the particle diameter exceeds 0.16 $\mu$m, fine unevenness tends to develop on a film surface, resulting in deterioration of a transparency and lowering of elongation at break.

The acrylic rubber-containing polymer (A) must have a calcium content of 50–500 ppm. Both when the calcium content is less than 50 ppm and when it is more than 500 ppm, the film tends to have a poor resistance to hot-water whitening.

The most suitable polymerization method as a process for preparing the acrylic rubber-containing polymer (A) in the present invention is a consecutive multi-stage polymerization using an emulsion polymerization method, but the method is not limited thereto. For example, it is also possible to conduct, after an emulsion polymerization, an emulsion-suspension polymerization which converts a polymerization system into a suspension polymerization system at the time of a polymerization of the outermost layer polymer.

The acrylic-based thermoplastic polymer (B) used in the present invention is a thermoplastic polymer which comprises 50–100% by weight of a methacrylic acid ester monomer unit having an alkyl group of 1–4 carbon atoms, 0–50% by weight of an acrylic acid ester monomer unit and 0–50% by weight of at least one kind of copolymeriable other vinyl monomer unit, has a glass transition temperature of the polymer of 65° C. or less and has a weight average molecular weight of 100,000–300,000. The glass transition temperature of the polymer is preferably lower than 60° C. When the glass transition temperature is higher than 65° C., elongation at break tends to be lower than 180%. The lower the glass transition temperature of the acrylic-based thermoplastic polymer (B), the more effective the polymer in improving elongation at bread of a film, but when the temperature is too low, a formation of a film tends to be difficult. The glass transition temperature is preferably not lower than 40° C. and lower than 60° C. A weight average molecular weight of the polymer of less than 100,000 or more than 300,000 is not preferable because the film apts to break at the time of a film formation. The acrylic-based thermoplastic polymer (B) is a component different from the polymer component of the outermost layer polymer of the acrylic rubber-containing polymer (A) which does not form a gel and is soluble in solvents; by separately polymerizing and adding the polymer as in the present invention, a drying and other operations can be conducted without difficulty even when the glass transition temperature is relatively low.

Examples of the methacrylic acid ester which may be used for the acrylic-based thermoplastic polymer (B) include methyl methacrylate, ethyl methacrylate and butyl methacrylate etc., methyl methacrylate being most preferred. Examples of the acrylic acid ester which may be used include methyl acryalte, ethyl acrylate and butyl acrylate etc. The acrylic acid ester is used in the range of 0–50% by weight, preferably 0.1–40% by weight. The copolymeriable other vinyl monomer which can be used may be monomers known to the art.

The method of polymerization for the acrylic-based thermoplastic polymer (B) is not particularly limited and may be a conventional one, for example, a suspension polymerization, an emulsion polymerization and a bulk polymerization. In the present invention, a chain transfer agent has to be used in order to adjust a weight average molecular weight of the acrylic-based thermoplastic polymer (B) to a specified range. The chain transfer agent used may be known ones, mercaptanes being preferred. An amount of the chain transfer agent has to be determined appropriately according to the kind and the composition of monomers.

A polymer (C) used in the present invention is a thermoplastic polymer which comprises 50–100% by weight of a methyl methacrylate monomer unit and 0–50% by weight of a unit of at least one kind of other vinyl monomer copolymerizable therewith, and has a reduced viscosity of the polymer (determined at 25° C. with a solution of 0.1 g of the polymer dissolved in 100 ml of chloroform higher than 0.1 L/g. The polymer is a component used for improving a film-forming property. The use of the polymer (C) is preferred because, though a film-forming is possible even when the polymer (C) is not used, then a melt tension is reduced and hence the film is formed with a difficulty unless an extrusion rate at the time of a film formation is decreased and a resin temperature is lowered, resultantly a productivity of the film deteriorates and moreover an unevenness of the film thickness increases.

The reduced viscosity of the polymer (C) is an important factor. When the reduced viscosity is 0.1 L/g or less, films with a good thickness accuracy cannot be formed. The reduced viscosity of the polymer (C) used is usually higher than 0.1 L/g and not higher than 2 L/g, preferably higher than 0.1 L/g and not higher than 1.2 L/g. The vinyl monomers copolymeriable with methyl methacrylate which can be used in the polymer (C) used in the present invention are, for example, acrylic acid alkyl esters, methacrylic acid alkyl esters, aromatic vinyl compounds and vinyl cyanide compounds etc. Polymerization is preferably conducted by an emulsion polymerization method. The polymer can be recovered in a form of powder by conventional methods of an emulsion polymerization and a post-treatment.

The acrylic film of the present invention is a film which comprises the acrylic rubber-containing polymer (A), the acrylic-based thermoplastic polymer (B) and, if desired, the polymer (C), respectively obtained as described above.

In the present invention, though a film formation is possible without using the polymer (C), it is preferable to use the polymer in an amount of 0.1–20 parts by weight for obtaining a satisfactory film-forming property. When the amount is larger than 20 parts by weight, a viscosity of the resulting resin composition tends to be too high, leading to a deterioration of a film-forming property.

The acrylic rubber-containing polymer (A) is used in an amount of 70–95 parts by weight. A gel content in the film obtained has to be 50% by weight–70% by weight. The gel content herein may be determined by a method similar to the method for gel content determination described before. When the gel content of the film is less than 50% by weight, elongation at break of the film cannot exceed 180% and the film breaks at the time of a bending work. When the gel content of the film exceeds 70% by weight, a film-forming property tends to be poor and an unevenness of a film thickness tends to increase. An amount of the acrylic rubber-containing polymer (A) used is specified to the range of 70–95 parts by weight in order to adjust the gel content of the film to 50% by weight–70% by weight.

The acrylic-based thermoplastic polymer (B) is used in an amount of 5–30 parts by weight. The acrylic-based thermoplastic polymer (B) serves as a main component of a matrix obtained. When the amount of the polymer used is less than 5 parts by weight, elongation at break of the film cannot exceed 180% and the film will breaks at the time of a bending work. An amount larger than 30 parts by weight is not preferable, because then the gel content of the resulting film becomes less than 50% by weight.

The acrylic film of the present invention may be incorporated, according to a necessity, with conventional compounding ingredients, for example, stabilizers, lubricants, processing aids, plasticizers, impact-resisting aids, blowing agents, fillers, coloring agents, delustering agents, polyalkylene glycol and ultraviolet absorbers. Particularly preferred additives are ultraviolet absorbers, delustering agents and polyalkylene glycol. The ultraviolet absorber is favorably added because it protects a base material by imparting a weather resistance thereto. The delustering agent is favorably added because recently delustered surfaces are preferred. A gloss of a film incorporated with a delustering agent may be selected as desired according to an intended effect in decorative design, but a surface gloss is preferably 10% to 100% and is more preferably not higher than 50% for a practical usage. When the surface gloss is higher than 50%, the surface gloss tends to be unfavorably high when the film is heated at the time of working. Polyalkylene glycol is favorably added to improve a resistance to hot-water whitening.

An amount of the ultraviolet absorber added is preferably 0.1–5% by weight. When the amount added is less than 0.1% by weight, virtually no weather resistance improving effect is obtained because an amount of the ultraviolet absorber per unit area is small. An addition of an amount exceeding 5% by weight is economically disadvantageous. Usually an addition of 1.0–3.0% by weight of the absorber is recommended. A molecular weight of the ultraviolet absorber used is preferably not less than 300, more preferably not less than 400. When an ultraviolet absorber having a molecular weight less than 300 is used, the absorber tends to volatilize at the time of a film formation or a film processing and possibly to stain rolls or the like and moreover the resulting film tends to be poor in weather resistance. The kind of ultraviolet absorbers is not particularly limited, but those of benzotriazole type having a molecular weight of 400 or more or those of triazine type having a molecular weight of 400 or more can be particularly preferably used. Specific examples of the former include Tinuvin 234 (a trade mark) of Ciba-Geigy Ltd. and Adekastab LA-31 (a trade mark) of Asahi Denka, and the specific examples of the latter include Tinuvin 1577 (a trade mark) of Ciba-Geigy Ltd.

The delustering agent used may be those known to the art. For example, inorganic particles, such as a mica and a talc, and organic crosslinked particles, such as polystyrene crosslinked particles, poly(methyl methacrylate) crosslinked particles, polyurethane crosslinked particles and silicone crosslinked particles, respectively having an average particle diameter of 0.5–20 μm, or linear polymers (D) having a hydroxyl group can be used in combination. Most preferred among these delustering agents is a linear polymer (D) having a hydroxyl group. Inorganic particles or organic crosslinked particles can be used only in a small amount because the use of these particles greatly deteriorates elongation at break of the resulting film, and hence a film gloss cannot be lowered markedly. When the linear polymer (D) having a hydroxyl group is used, it can be added in an increased amount because it exerts virtually no influence on elongation at break, so that films with desired gloss can be obtained.

The linear polymer (D) having a hydroxyl group used in the present invention may be obtained by polymerizing 1–80% by weight of a monomer unit of an acrylic acid hydroxyalkyl ester and/or a methacrylic acid hydroxyalkyl ester each having an alkyl group of 1–8 carbon atoms, 10–99% by weight of a monomer unit of a methacrylic acid alkyl ester having an alkyl group of 1–13 carbon atoms, 0–79% by weight of a monomer unit of an acrylic acid alkyl ester having an alkyl group of 1–8 carbon atoms and 0–50% by weight of a monomer unit of at least one copolymerizable other vinyl monomer.

The acrylic acid hydroxyalkyl ester and/or the methacrylic acid hydroxyalkyl ester (D-1) used in the linear polymer (D) having a hydroxyl group may be, for example, 2-hydroxyethyl methacrylate, 2-hydroxypropyl methacrylate, 2,3-dihydroxypropyl methacrylate, 2-hydroxyethyl acrylate and 4-hydroxybutyl acrylate. Particularly preferred of them is 2-hydroxyethyl methacrylate. The amount of the acrylic acid hydroxyalkyl ester and/or the methacrylic acid hydroxyalkyl ester to be used is in the range of 1–80% by weight. When the amount is less than 1% weight, an insufficient delustering effect is obtained. On the other hand, an amount higher than 80% by weight sometimes results in a lowered elongation or a poor surface condition. The range of an amount favorable for developing a good delustering effect is 5–50% by weight, preferably 20–50% by weight.

The methacrylic acid alkyl ester (D-2) used for the linear polymer (D) having a hydroxyl group is preferably a lower methacrylic acid alkyl ester, such as methyl methacrylate, ethyl methacrylate and butyl methacrylate, particularly preferably methyl methacrylate. The amount of the methacrylic acid alkyl ester used has to be in the range of 10–99% by weight and is preferably in the range of 30–85% by weight.

The acrylic acid alkyl ester (D-3) used in the linear polymer (D) having a hydroxyl group may be used in the range of 0–79% by weight. Specifically, lower acrylic acid alkyl esters, such as methyl acrylate, ethyl acrylate, butyl acrylate and 2-ethylhexyl acrylate, are favorably used. The acrylic acid alkyl ester is used in the range of preferably 0.5–40% by weight, more preferably 5–25% by weight.

In the linear polymer (D) having a hydroxyl group in the present invention, further, at least one kind of other vinyl monomer may be used in the range up to 50% by weight. Specifically, known monomers may be used, which include vinyl-aromatic monomers, such as styrene, vinyltoluene, α-methylstyrene and halogenated styrene, methacrylic acid, fumaric acid, maleic acid and copolymerizable carboxylic acids and esters thereof from which methacrylic acid alkyl esters having an alkyl group of 1–13 carbon atoms and acrylic acid alkyl esters having an alkyl group of 1–8 carbon atoms are excluded, vinyl halides, such as vinyl chloride and vinyl bromide, vinyl esters, such as vinyl acetate, and acrylonitrile.

Intrinsic viscosity of the linear polymer (D) having a hydroxyl group is preferably controlled to the range of 0.05–0.3 L/g so that the polymer may develop a good delustering property. Specifically, the intrinsic viscosity is controlled by using a polymerization degree controller, such as a mercaptan. Mercaptans used include, for example, n-octylmercaptan, n-dodecylmercaptan and t-dodecylmercaptan, but the controller is not limited thereto and other known ones may also be used.

Method for a preparation of the linear polymer (D) having a hydroxyl group in the present invention is not particularly limited, but the method of a suspension polymerization is preferably used owing to an advantage in cost. Initiator used for the suspension polymerization may be those used in a conventional suspension polymerization, which include organic peroxides and azo compounds. Suspension stabilizers used may be conventionally used ones, for example, organic colloidal high molecular substances, inorganic colloidal high molecular substances, inorganic fine particles, and a combination thereof with a surfactant. The suspension polymerization is usually conducted by subjecting the monomers, together with a polymerization initiator, to an aqueous suspension in the presence of a suspension stabilizer. Additionally, it is also possible to dissolve monomer-soluble polymers into the monomer and conduct the suspension polymerization.

The compounding amount of the linear polymer (D) having a hydroxyl group thus obtained is in the range of 1–40 parts by weight. For obtaining a good delustering property, it is preferably used in an amount not lower than 2.0 parts by weight.

In the present invention, it is preferably that 0.5–5 parts by weight of polyalkylene glycol is added. The addition of polyalkylene glycol improves a resistance to hot-water whitening of the film. The polyalkylene glycol used may be known ones, for example, polyethylene glycol, polypropylene glycol or alkyl ethers thereof. Most preferred of them is polyethylene glycol. The polyalkylene glycol is not particularly restricted as to its molecular weight, but those with a molecular weight of several thousands to several tens of thousand are preferably used because of an ease of handling and an economical advantage.

Method for producing the acrylic film used in the present invention may be any of a melt casting method and a melt extrusion method, such as a T-die method and a blown-film extrusion method, but the T-die method is preferred because of an economical advantage.

Thickness of the acrylic film is usually not more than 300 µm, preferably 30 µm–300 µm. When the thickness is less than 30 µm, a sufficient deepness cannot be obtained in appearance. When the thickness is larger than 300 µm, since a rigidity then tends to be too high, resulting in a deterioration of a laminatability and a secondary processability (a fabrication quality) and making it difficult to use it as a film. Moreover, it is economically disadvantageous since a weight per unit area increases. Furthermore, difficulties arise in a film-forming, and the film cannot be produced stably.

The acrylic film of the present invention is used in a lamination with various resin sheets, paper, wood, metal sheets, etc. Though a base material to be laminated with the acrylic film is not particularly limited, particularly preferably used are a sheet of a polyolefin or a resin comprising it as a main component, ABS or a resin comprising it as a main component, a polycarbonate or a resin comprising it as a main component, a polyvinyl chloride) or a resin comprising it as a main component, a polyurethane or a resin comprising it as a main component and a polyester or a resin comprising it as a main component. The resin sheet used may be a printed one or non-printed one. Further, the acrylic film may be used after it has been printed.

Some specific examples of the use of the present film is described below. The acrylic film obtained by the present invention is laminated onto a resin sheet, to which a printing of grain pattern or the like has been applied, with or without using an adhesive, the resulting product is further laminated with a resin molding, a woodwork, a formed metal articles, etc., and the laminates thus obtained are used for a vehicle interior finishing, a furniture and building materials, such as door materials and baseboards. The acrylic laminate of the present invention have a particularly good weather resistance and hence are suitable for use as building materials. The acrylic film of the present invention has elongation at break of 180% or more, so that when the film is laminated with various sheets and then subjected to a bending work, a stretching-laminating work, etc., the film can endure without causing a breaking, and thus the laminate is excellent in a followability to complicated shapes. If the elongation at break is small, the film breaks at the time of laminating work of the resin sheet onto various moldings and formed articles.

The present invention is described in detail below with reference to Examples, but it is not limited thereto. In the Examples, "part" means "part by weight" and "%" means "% by weight" (except for "%" of a tensile breaking elongation and "%" of surface gloss in Table 2). The meanings of abbreviations used in Examples are as follows.

MMA Methyl methacrylate
MA Methyl acrylate
BuA Butyl acrylate
BD 1,3-butylene glycol dimethacrylate
AMA Allyl methacrylate
St Styrene
EA Ethyl acrylate
HEMA 2-Hydroxyethyl methacrylate
CHP Cumene hydroperoxide
NOM n-Octylmercaptan The acrylic rubber-containing polymer (A), the acrylic-based thermoplastic polymer (B), the polymer (C) and the film obtained were examined for their properties by the following test methods.

1) Particle Diameter of Acrylic Rubber-containing Polymer (A)

Final particle diameter of a polymer latex of the acrylic rubber-containing polymer (A) obtained by an emulsion polymerization was determined by a dynamic light scattering method using a light scattering photometer DLS-700 (mfd. by Otsuka Denshi K.K.).

2) Glass Transition Temperature of the Outermost Layer of the Acrylic Rubber-containing Polymer (A) and the Acrylic-based Thermoplastic Polymer (B)

These were determined according to the Fox equation.

3) Weight Average Molecular Weight of the Acrylic-based Thermoplastic Polymer (B)

This was determined by using a Shimadzu LC-6A System (mfd. By Shimadzu K.K.), three connected KF-805L columns (mfd. By Showa Denko K.K.) being used as a GPC column and THF being used as a solvent, and calculated as a conversion to a polystyrene.

4) Reduced Viscosity of Polymer (C)

This was determined at 25° C. with a solution of 0.1 g of the polymer dissolved in 100 ml of chloroform.

5) Surface Gloss of Film

A surface gloss of a film was determined by using a gloss meter (Type GM-26D, mfd. by Murakami Color Research Laboratory) at an angle of 60°.

6) Film-forming Property

A film sample of 75 μm thickness was formed by a T-die method; when a thickness unevenness determined in a machine direction was not more than 10 μm, the film-forming property was designated as ○, when the thickness unevenness was more than 10 μm it was designated as Δ, and when the film sample could not be obtained owing to a breaking of the film it was designated as X.

7) Determination of Tensile Breaking Elongation of Film

A tensile breaking elongation was determined with a film of 75 μm thickness according to JIS Z170-2.

8) Resistance to Hot-water Whitening of Film

A film sample of 75 μm thickness was immersed in a hot water at 90° C. for 2 hours, then was taken out, dried at an ordinary temperature for 16 hours and then determined for its whiteness.

9) Bending Test of Acrylic Laminate

An acrylic laminate was sticked onto a wooden plate of 5 mm thickness with an epoxy-type adhesive, a V-cut was applied to a back side of the plate, and then the system was subjected to a V-cut bending. When a film breaking occurred, the test result was designated as X, when a bending part got whitened it was designated as Δ, and when neither a breaking nor a whitening occurred and a good result was obtained it was designated as ○.

10) Weather Resistance of Acrylic Laminate

The acrylic laminate was irradiated from an acrylic film-laminated surface side with an ultraviolet light at an intensity of 100 mW/cm² by using an I-Super UV-tester (a metal halide lamp type, mfd. by Dainippon Plastic K.K.). When a severe discoloration was observed the result was designated as XX, when some discoloration was observed it was designated as X, and when no discoloration was observed it was designated as ○.

EXAMPLES 1 AND 2 a) Preparation of Acrylic Rubber-containing Polymer (A-1)

In a reaction vessel were placed raw materials indicated in (i) and one half of the amounts indicated in (ii) below and were subjected to polymerization with stirring under nitrogen atmosphere at 80° C. for 90 minutes. Then, the remaining half of the materials shown in (ii) were added continuously over a period of 90 minutes and polymerization was conducted for further 120 minutes to obtain an elastomer latex.

To the elastomer latex obtained were successively added the raw materials shown in (iii), then stirred, the raw materials shown in (iv) were added continuously at 80° C. over a period of 45 minutes, and then polymerization was further conducted continuously at 80° C. for 1 hour to obtain an acrylic rubber-containing polymer (A) latex. The acrylic rubber-containing polymer (A-1) thus obtained had a particle diameter of 0.12 μm. The glass transition temperature of the outermost layer of the acrylic rubber-containing polymer (A-1) was 97° C.

The acrylic rubber-containing polymer (A-1) latex was subjected, by using calcium chloride, to coagulation, aggregation and solidification, then filtered, washed with water and then dried to obtain an acrylic rubber-containing polymer (A-1). The acrylic rubber-containing polymer (A-1) obtained had a gel content of 80% by weight and a calcium content of 150 ppm.

| (i) | |
|---|---|
| Deionized water | 300 parts |
| Sodium dioctylsulfosuccinate | 2.0 parts |
| Sodium formaldehyde sulfoxylate | 0.5 part |
| Ferrous sulfate | 0.00024 part |
| Disodium ethylenediaminetetraacetate | 0.00072 part |
| (ii) | |
| BuA | 80.0 parts |
| St | 19.0 parts |
| AMA | 1.0 part |
| CHP | 0.3 part |
| (iii) | |
| Deionized water | 5 parts |
| Sodium formaldehyde sulfoxylate | 1.2 parts |
| (iv) | |
| MMA | 76.6 parts |
| EA | 3.2 parts |
| NOM | 0.28 part |
| CHP | 0.24 part | b) Preparation of Acrylic-based Thermoplastic Polymer (B-1)

In a reaction vessel were placed 200 parts of deionized water which had been flushed with nitrogen, 77 parts of MMA, 23 parts of BuA, 3 parts of dibenzoyl peroxide, 0.12 part of NOM, 32 parts of an aqueous solution (3.3%) of a copolymer of MMA with potassium methacrylate as a suspension stabilizer and 0.004 part of manganese sulfate as a suspension stabilizing aid, and the resulting mixture was subjected to polymerization with stirring at 70° C. After confirming the polymerization peak, the polymerization mixture was heat treated with stirring at 90° C. for 30 minutes. After cooling, the resulting spherical particles were washed and dried to obtain an acrylic-based thermoplastic polymer (B-1).

The calculated value of the glass transition temperature of the acrylic-based thermoplastic polymer (B-1) thus obtained was 51° C. and the weight average molecular weight was 200,000.

c) Preparation of Polymer (c)

In a reaction vessel were placed 200 parts of deionized water which had been flushed with nitrogen, 1 part of potassium oleate as an emulsifier and 0.3 part of potassium persulfate. Succeeding, 40 parts of MMA, 10 parts of BuA and 0.005 part of NOM were charged, and the resulting mixture was stirred under nitrogen atmosphere at 65° C. for 3 hours to complete polymerization. Successively, a monomer mixture comprising 48 parts of MMA and 2 parts of BuA was added dropwise over a period of 2 hours and, after completion of the dropwise addition, the reaction mixture was allowed to stand for 2 hours to complete polymerization. The latex thus obtained was added to a 0.25% aqueous sulfuric acid solution to effect acid-coagulation of polymer, and the coagulated polymer was dehydrated, washed with water and dried to recover the polymer in the form of powder. The copolymer thus obtained had a reduced viscosity $\eta_{sp/c}$ of 0.38 L/g.

d) Preparation of Linear Polymer (D) Having a Hydroxyl Group

In a reaction vessel fitted with a stirrer, reflux cooler, nitrogen gas intet, etc. were placed the following mixture.

| | |
|---|---|
| MA | 20 parts |
| MMA | 60 parts |
| HEMA | 20 parts |
| NOM | 0.08 part |
| Lauroyl peroxide | 1 part |
| Calcium tertiary phosphate | 5 parts |
| Deionized water | 250 parts |

The inner atmosphere of the vessel was thoroughly replaced with nitrogen, then the above-mentioned mixture was heated up to 75° C. with stirring, and polymerization was made to proceed in a nitrogen gas stream. After 2 hours, the reaction mixture was heated up to 90° C. and kept at the condition for further 45 minutes to complete polymerization. The polymerization product was dehydrated and dried to obtain a linear polymer (D) having a hydroxyl group.

Determination of the intrinsic viscosity of the linear polymer gave a value of 0.11 L/g.

e) Preparation of Acrylic Film

The acrylic rubber-containing polymer (A-1), acrylic-based thermoplastic polymer (B-1), polymer (C) and linear polymer (D) having a hydroxyl group, each obtained as described above, and other additives were mixed in various proportions shown in Table 1 by using a Henschel mixer. The resulting mixture was melt-kneaded by using a 40 mmφ screw-type extruder (L/D=26) at a cylinder temperature of 200° C.–260° C. and die temperature of 250° C. and pelletized to obtain a film composition.

The pellet obtained above was dried at 80° C. for day and night and then extruded by using a 40 mmφ non-vent screw-type extruder (L/D=26) fitted with a 300 mm T-die at a cylinder temperature of 200° C.–240° C. and T-die temperature of 250° C. to form a film of 75 μm thickness.

Table 2 shows the results of evaluation of the film obtained.

f) Preparation of Acrylic Laminate

The acrylic film obtained by the above-mentioned method was bonded to a plasticized poly(vinyl chloride) film of 500 μm thickness by using a press at 160° C.

Table 2 shows the results of evaluation of the acrylic laminate obtained.

EXAMPLES 3–13 and

Comparative Examples 4 and 5

Acrylic laminate were prepared in the same manner as in Example 1 except for using the multilayer structure polymer (AA-1) shown below as the acrylic rubber-containing polymer (A). Table 1 shows the composition of film and Table 2 shows the results of evaluation.

a') Preparation of Multilayer Structure Polymer (AA-1)

The raw materials shown in (i) and (ii) below were placed in a reaction vessel and subjected to polymerization with stirring in nitrogen atmosphere at 75° C. for 60 minutes to obtain the innermost layer polymer (AA-a). Succeeding, the raw materials shown in (iii) below were added dropwise thereto with stirring under nitrogen atmosphere at 75° C. for 60 minutes to effect polymerization and form a crosslinked elastic polymer layer (AA-b). Successively, the materials shown in (iv) below were added dropwise with stirring under nitrogen atmosphere at 75° C. for 30 minutes to effect polymerization to form an intermediate layer (AA-d). Succeeding, further, the materials shown in (v) below were added dropwise with stirring under nitrogen atmosphere at 75° C. for 60 minutes, and after completion of the dropwise addition, further stirred at 75° C. for 120 minutes to complete polymerization. The multilayer structure polymer (AA-1) thus obtained had a particle diameter of 0.11 μm. The glass transition temperature of the outermost layer of the acrylic rubber-containing polymer (AA-1) was 68° C.

The multilayer structure polymer (AA-1) latex was subjected, by using calcium chloride, to coagulation, aggregation and solidification, and the resulting product was filtered, washed with water and then dried to obtain a multilayer structure polymer (AA-1) in the form of powder. The multilayer structure polymer (AA-1) obtained had a gel content of 75% by weight and a calcium content of 180 ppm.

| (i) | |
|---|---|
| Deionized water | 250 parts |
| Sodium dioctylsulfosuccinate | 2.0 parts |
| Sodium formaldehyde sulfoxylate | 0.05 part |
| Ferrous sulfate | 0.00024 part |
| Disodium ethylenediaminetetraacetate | 0.00072 part |
| (ii) | |
| MMA | 8 parts |
| BuA | 1.6 parts |
| BD | 0.3 part |
| AMA | 0.1 part |
| CHP | 0.05 part |
| (iii) | |
| MMA | 2 parts |
| BuA | 36.5 parts |
| BD | 1 part |
| AMA | 0.5 part |
| CHP | 0.5 part |

-continued (iv)

| | |
|---|---|
| MMA | 4 parts |
| BuA | 5.9 parts |
| AMA | 0.1 part |
| CHP | 0.05 part |

(v)

| | |
|---|---|
| MMA | 34 parts |
| BuA | 6 parts |
| CHP | 0.5 part |

EXAMPLES 14 AND 15 and

Comparative Examples 1–3

Acrylic laminates were prepared in the same manner as in Example 3 except for changing the composition of the acrylic-based thermoplastic polymer (B) to those shown in Table 3. Table 1 shows the compositions of film and Table 2 shows the results of evaluation.

EXAMPLES 16–21

Acrylic laminates were prepared in the same manner as in Example 3 except that, in preparing the acrylic laminates, various kinds of films shown in Table 4 were used in place of the plasticized poly(vinyl chloride) film and that an adhesive was used according to necessity. In all cases, acrylic laminates with good appearance were obtained, and no defect was observed in the bending test.

EXAMPLE 22

An arylic laminate was prepared in the same manner as in Example 3 except for applying a grain pattern printing to the acrylic film. An acrylic laminate with good appearance was obtained, and no defect was observed in the bending test.

Comparative Example 6

At the time of coagulation, aggregation and solidification conducted after polymerization of the acrylic rubber-containing polymer (A-1), magnesium sulfate was used in place of calcium chloride. The calcium content of the acrylic rubber-containing polymer (A-2) obtained was not more than the limit of determination, being less than 50 ppm.

An acrylic film was obtained in the same manner as in Example 1 but by using the acrylic rubber-containing polymer (A-2) obtained by the method described above. Table 1 shows the composition of the film obtained and Table 2 shows the results of evaluation.

TABLE 1

| | Acrylic rubber-containing polymer (A) | | Acrylic-based thermoplastic polymer (B) | | Polymer (C) | Linear polymer (D) having hydroxyl group | Other additives | |
|---|---|---|---|---|---|---|---|---|
| | Kind | Added amount (part) | Kind | Added amount (part) | Added amount (part) | Added amount (part) | Kind | Added amount (part) |
| Example 1 | A-1 | 70 | B-1 | 30 | 4 | 6 | PEG20000 | 2 |
| Example 2 | A-1 | 80 | B-1 | 20 | 4 | 6 | PEG20000 | 2 |
| Example 3 | AA-1 | 80 | B-1 | 20 | 4 | 6 | PEG20000 | 2 |
| Example 4 | AA-1 | 90 | B-1 | 10 | 4 | 6 | PEG20000 | 2 |
| Example 5 | AA-1 | 80 | B-1 | 20 | 4 | 6 | | 0 |
| Example 6 | AA-1 | 80 | B-1 | 20 | 0 | 6 | PEG20000 | 2 |
| Example 7 | AA-1 | 80 | B-1 | 20 | 4 | 0 | PEG20000 | 2 |
| Example 8 | AA-1 | 80 | B-1 | 20 | 4 | 6 | PEG20000 | 2 |
| | | | | | | | Tinuvin P | 1.5 |
| Example 9 | AA-1 | 80 | B-1 | 20 | 4 | 6 | PEG20000 | 2 |
| | | | | | | | Tinuvin 234 | 1.5 |
| Example 10 | AA-1 | 80 | B-1 | 20 | 4 | 6 | PEG20000 | 2 |
| | | | | | | | Tinuvin 1577 | 1.5 |
| Example 11 | AA-1 | 80 | B-1 | 20 | 4 | 6 | PEG20000 | 2 |
| | | | | | | | Uvinal 408 | 1.5 |
| Example 12 | AA-1 | 80 | B-1 | 20 | 4 | 15 | PEG20000 | 2 |
| Example 13 | AA-1 | 80 | B-1 | 20 | 4 | 0 | PEG20000 | 2 |
| | | | | | | | MBXK-8 | 2 |
| Example 14 | AA-1 | 80 | B-2 | 20 | 4 | 6 | PEG20000 | 2 |
| Example 15 | AA-1 | 80 | B-3 | 20 | 4 | 6 | PEG20000 | 2 |
| Comparative Example 1 | AA-1 | 80 | B-4 | 20 | 4 | 6 | PEG20000 | 2 |
| Comparative Example 2 | AA-1 | 80 | B-5 | 20 | 4 | 6 | PEG20000 | 2 |
| Comparative Example 3 | AA-1 | 80 | B-6 | 20 | 4 | 6 | PEG20000 | 2 |
| Comparative Example 4 | AA-1 | 60 | B-1 | 40 | 4 | 6 | PEG20000 | 2 |
| Comparative Example 5 | AA-1 | 100 | | 0 | 4 | 0 | PEG20000 | 2 |

TABLE 1-continued

| | Acrylic rubber-containing polymer (A) | | Acrylic-based thermoplastic polymer (B) | | Polymer (C) | Linear polymer (D) having hydroxyl group | Other additives | |
|---|---|---|---|---|---|---|---|---|
| | Kind | Added amount (part) | Kind | Added amount (part) | Added amount (part) | Added amount (part) | Kind | Added amount (part) |
| Comparative Example 6 | A-2 | 70 | B-1 | 30 | 4 | 0 | PEG20000 | 2 |

Note:
Tinuvin P — Benzotriazole type ultraviolet absorber
Tinuvin 234 — Benzotriazole type ultraviolet absorber
Tinuvin 1577 — Triazine type ultraviolet absorber
Uvinal 408 — Benzophenone type ultraviolet absorber
MBXK-8 — MMA crosslinked polymer, particle diameter 8 μm mfd. by Sekisui Kaseihin
PEG20000 — Polyethylene glycol MW20000
MW 225 — mfd. by Ciba-Geigy Ltd.
MW 448 — mfd. by Ciba-Geigy Ltd.
MW 425 — mfd. by Ciba-Geigy Ltd.
MW 326 — mfd. by BASF Ltd.

TABLE 2

| | Film property | | | | | | Acrylic laminate evaluation result | |
|---|---|---|---|---|---|---|---|---|
| | Gel content (%) | Tensile breaking elongation (%)* | Surface gloss (%)* | Film forming property | Resistance to hot-water whitening | | Bending test | Weather resistance |
| Example 1 | 50 | 185 | 42 | ○ | 34 | | Δ | — |
| Example 2 | 57 | 230 | 44 | Δ | 38 | | Δ | — |
| Example 3 | 54 | 225 | 32 | ○ | 33 | | ○ | xx |
| Example 4 | 60 | 182 | 33 | Δ | 38 | | ○ | — |
| Example 5 | 55 | 190 | 29 | ○ | 52 | | ○ | — |
| Example 6 | 56 | 213 | 34 | Δ | 31 | | ○ | — |
| Example 7 | 57 | 241 | 138 | ○ | 28 | | ○ | — |
| Example 8 | 53 | 231 | 33 | ○ | 32 | | ○ | x |
| Example 9 | 53 | 223 | 35 | ○ | 34 | | ○ | ○ |
| Example 10 | 54 | 236 | 31 | ○ | 33 | | ○ | ○ |
| Example 11 | 53 | 232 | 30 | ○ | 35 | | ○ | x |
| Example 12 | 50 | 191 | 12 | ○ | 46 | | ○ | — |
| Example 13 | 59 | 181 | 93 | ○ | 36 | | ○ | — |
| Example 14 | 54 | 192 | 28 | ○ | 32 | | ○ | — |
| Example 15 | 54 | 265 | 45 | ○ | 43 | | ○ | — |
| Comparative Example 1 | 54 | 132 | 43 | ○ | 34 | | x | — |
| Comparative Example 2 | 54 | — | — | x | — | | — | — |
| Comparative Example 3 | 54 | — | — | x | — | | — | — |
| Comparative Example 4 | 40 | 128 | 36 | ○ | 32 | | x | — |
| Comparative Example 5 | 71 | — | — | x | — | | — | — |
| Comparative Example 6 | 50 | 187 | 43 | ○ | 68 | | — | — |

Note
*: This % is not wt %.

TABLE 3

| | Polymerization composition | | | Polymer property | |
|---|---|---|---|---|---|
| Sample No. | MMA (part) | BuA (part) | NOM (part) | Glass transition temperature (° C.) | Weight average molecular weight |
| B-1 | 77 | 23 | 0.12 | 51 | $20 \times 10^4$ |
| B-2 | 83.5 | 16.5 | 0.12 | 65 | $21 \times 10^4$ |
| B-3 | 72 | 28 | 0.12 | 41 | $20 \times 10^4$ |
| B-4 | 87 | 13 | 0.12 | 72 | $21 \times 10^4$ |
| B-5 | 77 | 23 | 0.3 | 51 | $9 \times 10^4$ |

TABLE 3-continued

| | Polymerization composition | | | Polymer property | |
|---|---|---|---|---|---|
| Sample No. | MMA (part) | BuA (part) | NOM (part) | Glass transition temperature (° C.) | Weight average molecular weight |
| B-6 | 77 | 23 | 0.06 | 51 | 34 × 10⁴ |

TABLE 4

| | Base film | |
|---|---|---|
| | Base material | Printing |
| Example 16 | Plasticized poly(vinyl chloride) (obtained from Dainippon Insatsu K.K.) | None |
| Example 17 | Plasticized poly(vinyl chloride) (obtained from Dainippon Insatsu K.K.) | Grain pattern printing |
| Example 18 | Polypropylene (obtained from Dainippon Insatsu K.K.) | Grain pattern printing |
| Example 19* | ABS resin (Diapet 3001M, mfd. by Mitsubishi Rayon K.K.) | None |
| Example 20* | Polycarbonate (Tuflon A2500, mfd. by Idemitsu Sekiyukagaku K.K.) | None |
| Example 21* | PET resin (PETG-14471, mfd. by Eastman Ltd.) | None |

Note:
*Sheets used in Examples 19–21 are sheets of 500 µm thickness prepared by using the extruder fitted with T-die used in Example 1.

Industrial Applicability

According to the present invention, acrylic films, which has a good processability and which do not break even when subjected to bending work etc. at a high speed, can be obtained. By lamination-bonding the film, acrylic laminates can be obtained which can be used as building materials or the like that can give a good decorative effect.

What is claimed is:
1. An acrylic film, comprising:
70 to 95 parts by weight of (A), an acrylic rubber-containing polymer; and
5 to 30 parts by weight of (B), an acrylic-based thermoplastic polymer;
wherein a total amount of (A), the acrylic rubber-containing polymer, and (B), the acrylic-based thermoplastic polymer, is 100 parts by weight;
wherein a gel content is 50 to 70% by weight; and
wherein an elongation at break in one direction is 180% or more;
wherein (A), the acrylic rubber-containing polymer, comprises
(a) an elastic copolymer comprising 50 to 99.9% by weight of an alkyl ester of an acrylic acid monomer unit, 0 to 49.9% by weight of another copolymerizable vinyl monomer unit, and 0.1 to 10% by weight of a copolymerizable crosslinkable monomer unit, and
(b) a monomer unit or a mixture thereof comprising 40 to 100% by weight of an ester of a methacrylic acid and 0 to 60% by weight of a vinyl monomer copolymerizable therewith;
wherein (A), the acrylic rubber-containing polymer, has a glass transition temperature exceeding 65° C., a gel content of at least 60% by weight, a graft rubber particle diameter of 0.08 to 0.16 µm, and a calcium content of 50 to 500 ppm; and
wherein the acrylic rubber-containing polymer (A) is obtained by graft-polymerizing 10 to 400 parts by weight of (b), the monomer unit or the mixture thereof, and 100 parts by weight of (a), the elastic copolymer, and wherein at least 10% of (b) the monomer unit or the mixture thereof is bonded to and is graft-polymerized onto (a), the elastic copolymer, and wherein (B), the acrylic-based thermoplastic polymer, comprises
50 to 100% by weight of an ester of a methacrylic acid monomer unit having an alkyl group of 1 to 4 carbon atoms,
0 to 50% by weight of an ester of an acrylic acid monomer unit, and
0 to 50% by weight of at least one other copolymerizable vinyl monomer unit; and wherein (B), the acrylic-based thermoplastic polymer, has a glass transition temperature of 65° C. or less and a weight average molecular weight of 100,000 to 300,000; and wherein the acrylic-based thermoplastic polymer (B) is different from a polymer component of an outermost layer polymer of the acrylic rubber-containing polymer (A).

2. The acrylic film according to claim 1, wherein (A) the acrylic rubber-containing polymer is a multilayer structure polymer (AA) which comprises an innermost layer polymer (AA-a) formed from 100 parts by weight of a monomer mixture comprising 80–100% by weight of an acrylic acid alkyl ester having an alkyl group of 1–8 carbon atoms or methacrylic acid alkyl ester having an alkyl group of 1–4 carbon atoms (AA-a1), 0–20% by weight of another monomer having a copolymerizable double bond (AA-a2) and 0–10% by weight of a multifunctional monomer (AA-a3), and 0.1–5 parts by weight of a graft-linking agent; a crosslinked elastic polymer (AA-b) formed from 100 parts by weight of a monomer mixture comprising 80–100% by weight of an acrylic acid alkyl ester having an alkyl group of 1–8 carbon atoms (AA-b1), 0–20% by weight of another monomer having a copolymerizable double bond (AA-b2) and 0–10% by weight of a multifunctional monomer (AA-b3), and 0.1–5 parts by weight of a graft-linking agent; and an outermost layer polymer (AA-c) formed from 51–100% by weight of a monomer unit of a methacrylic acid alkyl ester having 1–4 carbon atoms (AA-c1) and 0–49% by weight of a monomer unit of another monomer having a copolymerizable double bond (AA-c2), and having a glass transition temperature exceeding 65° C., as a basic structure; and the multilayer structure polymer (A) comprises, between the layer of the crosslinked elastic polymer (AA-b) and the outermost layer of the polymer (AA-c), as an intermediate layer, at least one intermediate layer (AA-d) of a polymer formed from 100 parts by weight of a monomer mixture comprising 10–90% by weight of an acrylic acid alkyl ester having an alkyl group of 1–8 carbon atoms (AA-d1), 90–10% by weight of a methacrylic acid alkyl ester having an alkyl group of 1–4 carbon atoms (AA-d2), 0–20% by weight of a monomer having a copolymerizable double bond (AA-d3) and 0–10% by weight of a multifunctional monomer (AA-d4), and 0.1–5 parts by weight of a graft-linking agent, the amount of the monomer unit of the acrylic acid alkyl ester in the intermediate layer decreasing monotonously from the layer of the crosslinked elastic polymer (AA-b) toward the outermost layer of the polymer (AA-c); and wherein the multilayer structure polymer has a gel content of at least 60% by weight, a graft rubber particle diameter of 0.08–0.16 µm and a calcium content of 50–500 ppm.

3. The acrylic film according to claim 1, wherein the acrylic film further comprises 0.1–20 parts by weight of a polymer (C) comprising 50–100% by weight of a methyl methacrylate monomer unit and 0–50% by weight of at least one other copolymerizable vinyl monomer unit; and wherein said polymer (C) has a reduced viscosity higher than 0.1 L/g, as determined at 25° C. with a solution of 0.1 g of the polymer dissolved in 100 ml of chloroform.

4. The acrylic film according to claim 1, wherein the acrylic-based thermoplastic polymer (B) has a glass transition temperature lower than 60° C.

5. The acrylic film according to claim 1, wherein the acrylic film further comprises 0.5–5 parts by weight of a polyalkylene glycol.

6. The acrylic film according to claim 1, wherein the acrylic film has a surface gloss of 50% or less.

7. The acrylic film according to claim 6, wherein the acrylic film further comprises 1–40 parts by weight of (D) a linear polymer having a hydroxyl group which comprises 1–80% by weight of a monomer unit of an acrylic acid hydroxyalkyl ester and/or a methacrylic acid hydroxyalkyl ester each having an alkyl group of 1–8 carbon atoms (D-1), 10–99% by weight of a monomer unit of a methacrylic acid alkyl ester having an alkyl group of 1–13 carbon atoms (D-2), 0–79% by weight of a monomer unit of an acrylic acid alkyl ester having an alkyl group of 1–8 carbon atoms (D-3) and 0–50% by weight of a unit of at least one other copolymerizable vinyl monomer (D-4).

8. The acrylic film according to claim 1, wherein the acrylic film contains 0.1–5% by weight of an ultraviolet absorber.

9. The acrylic film according to claim 8, wherein the ultraviolet absorber is a benzotriazole or a triazine based ultraviolet absorber having a molecular weight of 300 or more.

10. An acrylic laminate, comprising:

a laminated and bonded acrylic film according to claim 1.

11. An acrylic laminate building material, comprising:

a laminated and bonded acrylic film according to claim 1.

12. The acrylic laminate according to claim 10, wherein said acrylic film is laminated and bonded to a printed or non-printed polyolefin or resin comprising it as a main component.

13. The acrylic laminate according to claim 10, wherein said acrylic film is laminated and bonded to a printed or non-printed ABS or resin comprising it as a main component.

14. The acrylic laminate according to claim 10, wherein said acrylic film is laminated and bonded to a printed or non-printed polycarbonate or resin comprising it as a main component.

15. The acrylic laminate according to claim 10, wherein said acrylic film is laminated and bonded to a printed or non-printed poly(vinyl chloride) or resin comprising it as a main component.

16. The acrylic laminate according to claim 10, wherein said acrylic film is laminated and bonded to a printed or non-printed polyester or resin comprising it as a main component.

17. The acrylic laminate according to claim 10, wherein said acrylic film has been printed, and is laminated and bonded.

* * * * *